(12) United States Patent
Kodash et al.

(10) Patent No.: US 6,617,271 B1
(45) Date of Patent: Sep. 9, 2003

(54) TUNGSTEN CARBIDE CUTTING TOOL MATERIALS

(76) Inventors: Vladimir Yurievich Kodash, 1505 Oak Ave., Davis, CA (US) 95616; Edwin Spartakovich Gevorkian, 155 Poltavskij Shlyax Str., Apt. #156, Kharkov, Kharkovskaya (UA), 61064

( * ) Notice: Subject to any disclaimer, the term of this patent is extended or adjusted under 35 U.S.C. 154(b) by 0 days.

(21) Appl. No.: 10/100,488

(22) Filed: Mar. 19, 2002

(51) Int. Cl.⁷ .................................................. C04B 35/56
(52) U.S. Cl. ............................ 501/87; 501/93; 407/119
(58) Field of Search ....................... 501/87, 93; 407/119

(56) References Cited

U.S. PATENT DOCUMENTS

| | | | | |
|---|---|---|---|---|
| 4,828,584 A | * | 5/1989 | Cutler | 51/307 |
| 5,563,107 A | * | 10/1996 | Dubensky et al. | 501/87 |
| 5,612,264 A | * | 3/1997 | Nilsson et al. | 501/87 |
| 5,681,783 A | * | 10/1997 | Nilsson et al. | 501/87 |
| 5,952,102 A | * | 9/1999 | Cutler | 428/408 |
| 5,984,593 A | * | 11/1999 | Bryant | 407/119 |
| 6,204,213 B1 | * | 3/2001 | Mehrotra et al. | 501/95.3 |

* cited by examiner

*Primary Examiner*—Karl Group

(57) ABSTRACT

The disclosed invention describes a new high-performance binderless high purity tungsten carbide material, its manufacturing and applications as a cutting tool material.

25 Claims, No Drawings

TUNGSTEN CARBIDE CUTTING TOOL MATERIALS

CROSS REFERENCE TO RELATED PATENTS

This is a continuation of our provisional application filed Mar. 12, 2001 bearing Ser. No. 60/274,582.

REFERENCE CITED

US Patent Documents

| | | | |
|---|---|---|---|
| 6204213 | March, 2001 | Mehrotra | 501/95.3 |
| 5984593 | November, 1999 | Bryant | 407/119 |
| 5952102 | September, 1999 | Cutler | 428/407 |
| 5681783 | October, 1997 | Nilsson | 501/87 |
| 5612264 | March, 1997 | Nilsson | 501/87 |
| 5563107 | October, 1996 | Dubensky | 501/87 |
| 4828584 | May, 1989 | Cutler | 51/307 |

Other References

Tokito, Masso "Mechanism of spark plasma sintering and its application to ceramics",
Nyu Seramikkusu (1997), 10(10), 43–53.
J. R. Groza, A Zavaliangos, "Sintering activation by external electrical field", Mater. Sci. Eng., A287(2), (2000) 171–177.
Mamoru Omari "Sintering consolidation, reaction and crystal growth by the spark plasma system (SPS)", Mater. Sci. Eng., A287(2), (2000) 183–188.

BACKGROUND OF THE INVENTION

1. Field of Invention

This invention relates to the field of tungsten carbide materials suitable for cutting and wear applications.

2. Description of the Prior Art of the Invention

Cemented tungsten carbide materials have become the working horse for a large number of machining and wear applications. These materials exhibit a Co binder phase which enables sintering at relative low temperatures while the ductile phase provides a relative high toughness and transverse rupture strength. On the other side, the ductile Co binder reduces hardness and temperature stability. However, during the last decades performance requirements of carbide cutting tools have become ever more demanding due to increased cutting speeds and new work materials (super-alloys, titanium alloys, metal matrix composites, etc) requiring higher contact point temperatures and wear resistance. For hardened steels and nickel based super alloys, cutting tools must have high wear resistance at the cutting edge. At high cutting speeds the temperature at the cutting tip reaches temperatures around 800 to 1000 ° C., demanding excellent high-temperature strength and wear resistance of the tool material without reacting with the work piece. Diffusion processes in the tool material, which can be promoted by metal impurities and residual metal binders phases, can potentially increase the wear and must be kept as low as possible. The machining of a relatively brittle alloy like cast iron creates may cause chipping of the cutting tool edge which demands high toughness and hardness of the tool bit. In case of machining aluminum, the wear is mostly adhesive. The chip may stick on the cutting edge decreasing the quality of the machined surface. The tool material therefore needs to have a low friction with the work piece and good thermal conductivity to decrease the temperature at the cutting point. The particular problem of machining titanium alloys is their high toughness causing significant wear—in particular crater wear—on the tool. This is enhanced by the strong reactivity of Ti with many cutting tool materials. In particular the binder phase in cemented carbides promotes the reaction with Ti.

Consequently, various attempts have been made to reduce or omit the binder content in polycrystalline tungsten carbide.

However, the lower the binder content becomes the higher sintering temperatures and pressures have to be in order to produce dense compacts. The higher temperatures required for sintering conventional submicron WC typically result in excessive grain growth which results in a brittle material with only moderate performance in machining applications. The literature suggests a number of routes to manufacture such a dense body. It is then possible to use nonstoichiometric tungsten carbide which exhibits a higher reactivity during sintering and can be consolidated with reasonable effort. However, the non-stoichiometry enhances grain growth during sintering which is undesirable for cutting tool applications. In a similar way mixtures of W, WC, carbon, and other carbides and nitrides promote reactive sintering which accelerates densification. An unwelcome result is that the content of phases softer than WC increases thus limiting the overall hardness and wear resistance in particular at high temperatures. Additional phases also mean a higher chemical reactivity with the work piece material and decreasing wear resistance of the tool bit which becomes critical at temperatures around 1000 ° C. which occur under modern high-high-speed machining conditions are required for modern machining conditions.

A further approach is to mill binderless tungsten carbide with cemented tungsten carbide balls. The latter produce a well distributed contamination of cobalt in the powder. While the cobalt contamination improves the sinterability of the WC powder, grain growth also can become a problem thus reducing the materials fracture toughness. Consequently, strength and hardness are below the desirable optimum. In fact, all procedures described to make a "binderless" tungsten carbide contain Co at least on a contamination level which is more than 0.1% by weight.

All methods utilizing more or less binderless powders or powder mixtures require pressure (hot-pressing) and relative high temperatures, typically 200–500 ° C. higher than cemented carbide. The most common techniques are hot-pressing and hot isostatic pressing (HIP). If the sintering technique allows for high pressures like HIPing, the temperature can be reduced which enables to maintain a small grain size in the sintered body. HIPing, however, is a complicated process which requires encapsulation of the green compact or powder batch. The encapsulation process usually seals the specimen off which traps impurities or surface oxides which are undesirable. Detailed analysis of commonly produced "binderless" tungsten carbide show that always small quantities of residual phases in between the WC grains exist. This can only be overcome by an additional costly reduction treatment. Conventional hot-pressing or similar techniques like "Rapid Omn-idirectional Compaction" also do not address the purification need adequately and are commonly slow processes thus enhancing the grain growth problem at higher temperatures. Contaminating impurities can diffuse from the furnace environment into the specimen, and the surface oxides on the powder particles are usually not significantly reduced during sintering thus retarding the densification and reducing the strength of the sintered body.

The patent literature also describes the application of "binderless" tungsten carbide for machining titanium. While titanium is definitely a critical application it would be desirable to have a more versatile tungsten carbide which is suitable for a wider range of machining applications and tool materials.

A need therefore exists to produce a high-purity, stoichiometric tungsten carbide material with ultrafine grain size in order to obtain a very strong, tough and hard body with excellent high-temperature chemical and mechanical stability and good thermal conductivity.

A further need exists for a sintering process which is fast, economical, and able to remove surface oxides—in particular of nanosized powders—in an efficient way.

SUMMARY

Disclosed is a new polycrystalline tungsten carbide material, its manufacturing and applications for tools like cutting inserts used in turning, milling, honing and drilling of a wide range of metals, plastics, ceramics and wood, and highly wear resistant parts like wire-drawing dies. The material is made from an ultrafine, very pure tungsten carbide powder without any metal binder additions and sintered with a special, purifying technique into a dense, strong, hard polycrystalline body. Cutting tools or inserts made from this material are particularly suited for high-speed machining, hard turning and rough turning of steels and ferrous alloys, alloys which are difficult to be machined due to work hardening, like nickel superalloys, and titanium and its alloys. The performance of the disclosed material is almost comparable to the performance of polycrystalline cubic boron nitride (cBN), without requiring the expensive ultra-high pressure process of manufacturing cBN, and substantially superior to binderless WC cutting tool materials reported to date.

DESCRIPTION OF PREFERRED EMBODIMENT

The disclosed material is an essentially binder free (Co<0.01%), very pure tungsten carbide with high relative densities (>98.5%) and extreme fine grain sizes, with a mean grain size equal to or below 0.5 $\mu$m and preferably below 0.2 $\mu$m.

The disclosed tungsten carbide has essentially the following features:

It is made by a process
  that utilizes a high-purity, ultrafine or nanosized WC powder batch with essentially no metal additions, that utilizes at least a partial in-situ heating, meaning heat is generated within the powder batch, which can be accomplished by passing an electric current through it, by microwaves, or by induction heating. Nonetheless, the powder may be confined in a conductive mold or die which is heated simultaneously with the powder batch, which is carried out at reduced gas pressures, preferably below $10^{-2}$ Pa. with very fast heating rates in excess of 100° C./min and short dwell times with less than 15 min at maximum temperature, with optionally applying a mechanical pressure during sintering.
  with optionally including a powder processing step comprising of extended ball milling with binder-free WC balls in an organic solvent and a spray-drying step to obtain a granulated powder suitable for dry pressing, or a pressure filtration step utilizing the as-milled (and screened) slurry to produce a solid green compact.

The sintered compact
  has a porosity of equal to or less than 1%.
  has a mean particle size of equal to or less than 0.5 $\mu$m, but preferably less than 0.2 $\mu$m.
  has a Vickers hardness of $HV_{10}$ equal to or better than 23 GPa
  has a fracture toughness equal to or better than 8 MPam$^{1/2}$.

It appears that the combination of the use of an ultrafine and pure WC powder, in-situ heating with very fast heating rates, vacuum, and with no cobalt additions or cobalt contamination results in an extraordinary fine microstructure with grain sizes in the range of 0.1 to 0.5 $\mu$m and improved strength, high fracture toughness and hardness, contributing substantially to an overall superior cutting performance which substantially exceeds reported data on cutting tool performance. The in-situ heat generation results in a more uniform temperature distribution while allowing for faster heating rates. Also, it enhances debonding of surface oxides. It is common that during sintering a noticeable amount of material evaporates which is considered indicative for volatiles and surface oxides being removed from powder particle surfaces, thus providing better bonding between particles. The literature on "Spark-Plasma-Sintering" (SPS) and "Field-Activated-Sintering Technology" (FAST) describes the anticipated mechanisms responsible for the surface purification effects. They are attributed to the combined action of vacuum, a reducing atmosphere established by using graphite die sets, micro-discharging and micro-sputtering effects at particle-to particle contacts and preferential particle contact heating. While SPS and FAST rely on a pulsed, square-wave direct current, the disclosed tool material can be obtained with excellent properties by simply applying a rectified or straight alternate current.

The finer grain structure, in line with higher toughness, hardness and strength, reduces in particular abrasive wear at the contact point of work piece and cutting tool during cutting, but also crater wear caused during machining titanium alloys or other materials which generate a hot erosive swarf during cutting, especially in case of high speed machining. The exceptional performance of the binderless tungsten carbide disclosed has the further advantage that a surface coating is often not needed, though, when coating with CVD diamond, the hardness of the cutting edge can be increased while the WC is a better substrate material than commonly used WC-Co tool materials. Binderless WC shows excellent high temperature strength and by using protective atmosphere higher operation temperatures can be tolerated utilizing the fact that many work piece materials soften at temperatures above 800° C.

A further advantage of the disclosed material is the broad spectrum of work material that can be machined, ranging from metals to plastics, metal-matrix composites, some ceramics and rocks and wood products. Beyond, rough and high-speed turning it shows also substantial potential for improved surface finishing, resulting from the extreme fine microstructure and superior cutting edge stability.

Since a material like this is typically made from very fine powders the technical challenge is to consolidate it to full density without causing excessive grain growth as to maintain its unique set of properties, i.e. high hardness and wear resistance, high strength and fracture toughness.

The exact conditions required for optimum consolidation change somewhat with the specific experimental conditions chosen. Also temperature measurements are usually subject to major measurement errors. Consequently, heating profiles have to be determined experimentally and should be based on monitoring the sintering rate. Typically, heating rates should be fastest up to the point were the maximum densification rate is observed (assuming constant heating rate condition finding runs). Heating rates may then be reduced by up to a factor of 2 until the densification rate levels off. Dwell times at maximum temperatures are typically 1–15 min, depending on the experimental details.

The utilization of powder processing, which is the wet milling with binderless WC balls, and subsequent pressure filtration, or spray-drying without organic binder additions+ dry pressing results in a more uniform green compact which is less prone to inhomogenous energy generation in the sintering compact. The advantage is a more homogenous microstructure.

Yet another important aspect is to use a tungsten carbide powder whose composition is stoichiometric. Stoichiometric powders show less grain growth during sintering than non-stoichiometric powders.

The very fast sintering process usually results in thermal stresses of the sintered body. These stresses can be reduced by annealing the material for about an 1 h at a temperature of 1200° C. in vacuum or inert atmosphere and a slow cool down over 3–5 h.

It has further been found that the microstructure of the WC can be tailored by introducing small quantities of vanadium carbide or chromium carbide as grain growth inhibitors into the WC powder batch. Additions should be less than 5% by volume, but preferably between 0.1 and 2% by volume. However, the effectiveness of these two grain growth inhibitors is strongly dependent on its particle size. It was found to be essential that the inhibitors added to the tungsten carbide powder have a mean particle size of 100 nm or less.

A major advantage of the WC is its electrical conductivity allowing to EDM-cut it into desired shapes. This technique is generally preferred over grinding or saw-cutting. Grinding is carried out only to process the tool into final shape and to remove surface damage from EDM cutting. However, for the examples given below, saw-cutting and grinding was used to manually process the material into a standard shape. It is anticipated that this resulted in a somewhat lower edge quality. By carrying out more controlled edge preparation on a CNC grinding machine the edge quality is usually better and cutting performance is improved. Accordingly, results shown below are likely to be better when using CNC grinding for edge preparation.

EXAMPLE 1

Sinterng 25 g of an ultra-fine tungsten carbide powder with a specific surface area of 5 m$^2$/g and 99.99% non-oxide purity (OMG America, oxygen content: 0.25% by weight) was loosely filled into a graphite die (60 mm long, 45 mm outer diameter, 25 mm bore diameter) and enclosed by 2 graphite pistons (40 mm long). The graphite was a high strength graphite with a tensile strength of 85 MPa.

The die set was placed into a hot-press (Mechanical press HC265, 30 to, Ukraine) modified in such a way that heating was performed by running an AC current through the water-cooled rams and through the die set. The power supply was capable to produce an AC current of 3500 A at 6 V. Temperature was feedback controlled via thermocouple which was attached to the center portion of the die. The hot-press was pre-loaded with 70 MPa uniaxial pressure and twice flushed with Argon and evacuated down to a final gas pressure of 10$^{-2}$ Pa before heat was switched on. A number of evaluation experiments were carried out to find a suitable heating profile. The following profile was subsequently used for making the cutting tool material:

Heating in 10 min from 20 to 1530° C., heating from 1530 to 1640° C. in 1 min, dwell for 2 min at 1640° C., shut down power (temperatures were measured on the die surface, being approximately 150–200° C. lower than internal temperatures).

Specimen were annealed at 1200° C. for 1 h in Argon atmosphere with cooling down in 5 h.

Material Evaluation

Specimen were characterized with respect to hardness, toughness, and microstructure.

Vickers hardness and toughness was measured from 10 indentations produced under a 10 Kg load on polished cross-sections of the specimen.

A hardness value of 24.4 GPa was found, fracture toughness was measured from crack lengths and found to be 9.2 MPam$^{1/2}$.

SEM micrographs were taken of a fractured surface. The average grain size was determined to be of 0.5 μm with a small fraction (less than 1 vol %) in the range of 2 μm.

Chemical analysis showed that the oxygen content in the sintered body was <0.01 wt %.

Density was measured by the Archimedes method and found to be 98.9% rel. density

Tool Bit Preparation

The tungsten carbide specimen were saw-cut into rectangular tool bits and ground and shaped on a BM200/21 grinder (Wendt, Germany) using ceramically bonded diamond wheels with grit size 80/63. Finishing of the bits was carried out on a 2U-8 Walter (Germany), obtaining a surface roughness of Ra 0.16.

Tool inserts were according to ISO specifications, for the disclosed WC and the reference WC-Co CSDPR2525F12, for CBN tool CRDCR2225F10.

Turning Tests

Turning tests with the tungsten carbide tools manufactured as described above and some commercial tools for reference were carried out on a lathe for high precision machining (16B05, manufactured in USSR) with the following operational parameters:

Power: 12.5 kW,

Rotational Speed: 12.5–1600 rev/min

Typical work piece dimensions: 100 mm diameter, 250 mm length

The lathe was capable to maintain a constant cutting speed by continuously adjusting the rotational speed as the diameter of the work piece changed.

Tool holders: T-MAX (manufactured by Sandvik Coromant, Sweden).

The time required to produce a flank wear ($V_B$) of 0.4 mm was chosen as the wear criterion and measured by a microscope with 1 μm optical resolution, mounted on the lathe.

The following work piece materials were used:

Steel X12M (manufactured by Dnepropetrovckij Plant, Ukraine, containing 1% C, 12%Cr, 1% Mo; Rockwell hardness HRC 56–58, with an 0.2 hardened surface layer).

White gray cast iron C412 (manufactured by Krivorozkij Plant, Ukraine, Brinell Hardness (HB) 240–280).

Cast aluminum alloy AL30 (manufactured by Krasnoyarskij Aluminum Plant, Russia, containing 12% Si, HB: 90–120).

Titanium alloy BT3-1 (manufactured by Zaporozckij Plant of Titanium Alloys, Ukraine, containing 5% Al, 2% Cr, 3% Mo, HB:260–280.

Steel 18 XGT manufactured by Krivorozkij Plant, Ukraine, HRC 55–58, 0.18% C, 1% Co, 1% Mn, 1% Ti) with longitudinal grooves (width 5 mm, spacing 3 mm), Used for interrupted cutting.

The following cutting tools were tested for comparison:

WC-Co, BK8 (manufactured by Kirovogradskij Plant of Hard Alloys, Ukraine, containing 8% Co, WC particle size 1–2 μm).

$Al_2O_3$ cutting tool HCl (manufactured by Nippon Technical Ceramics, Japan)

cBN based cutting tool Geksanit-P (manufactued by Poltavskij Diamond Plant, Ukraine, comparable to Amborite)

Tool orientations/geometries

Disclosed WC tool and WC-Co reference tool: φ (cutting edge angle): 45°, $φ_1$ (face cuttingedge angle): 45°, γ (tool rake angle): 6°, λ (tool cutting edge inclination angle):0°

Alumina and Geksanit-P: φ: 45°, $φ_1$:45°, γ:−6°, λ:0°

The table below shows cutting parameter and the time in minutes required to reach 0.4 mm wear of X12M steel and 18XGT steel (interrupted cutting):

|  | Turning | | | | | | | | | Interruped cutting |
|---|---|---|---|---|---|---|---|---|---|---|
| Cutting speed/m/min | 100 | 100 | 100 | 300 | 300 | 300 | 500 | 500 | 500 | 200* |
| feed rate/mm/rev | 0.1 | 0.5 | 1.0 | 0.1 | 0.5 | 1.0 | 0.1 | 0.5 | 1.0 | 0.5 |
| depth of cut/mm | 0.5 | 2.0 | 4.0 | 0.5 | 2.0 | 4.0 | 0.5 | 2.0 | 4.0 | 2 |
| Tools WC-Co | 12 | 8 | 5 | 8 | 6 | 3 | 3 | 2 | 0.5 | 3 |
| discl. WC | 30 | 28 | 20 | 25 | 22 | 10 | 20 | 15 | 12 | 25 |
| Alumina | 21 | 15 | 8 | 10 | 8 | 5 | 8 | 5 | 3 | broken |
| cBN | 34 | 29 | 22 | 27 | 23 | 11 | 22 | 15 | 13 | 24 |

The WC-Co tool showed a tendency of build-up during rough turning, the character of wear for the disclosed binderless WC is typically abrasive and appears to be more resistant to adhesive wear than WC-Co. The interrupted cutting reveals that the disclosed binderless WC tool material is still substantially superior to WC-Co despite its lower fracture toughness. It is noteworthy that for interrupted cutting the disclosed WC is equal, if not better than the cBN tool.

The table below shows cutting parameters and the time in minutes required to reach 0.4 mm wear for other metals/alloys.

|  | White grey cast Iron C412 | Titanium alloy BT3-1 | Aluminum* AL30 | Al-SiC |
|---|---|---|---|---|
| Work piece: | | | | |
| Cutting speed/m/min | 100  300  500 | 300 | 300 | 150 |

|  | White grey cast Iron C412 | | | Titanium alloy BT3-1 | Aluminum* AL30 | Al-SiC |
|---|---|---|---|---|---|---|
| Feed rate mm/rev | 0.5 | 0.5 | 0.5 | 0.5 | 0.5 | 0.5 |
| Depth of cut/mm | 2 | 2 | 2 | 2 | 2 | 2 |
| Tools: | | | | | | |
| WC-Co | 8 | 2 | 1 | 5 | 45 | 14 |
| discl. WC | 25 | 22 | 18 | 30 | 121 | 38 |
| Alumina | 20 | 16 | 10 | 15 | 92 | 12 |
| cBN | 28 | 23 | 19 | 33 | 132 | 41 |

*):with cooling liquid, 3% soda solution.

The disclosed WC outperformed WC-Co and Alumina under all conditions applied (in terms of wear resistance) thus exhibiting a large versatility in use with respect to work piece materials and cutting conditions. This suggest that the disclosed WC tool is superior to any other common cutting tool material currently available, with the exception of superabrasives like cBN or diamond. It is particularly well suited for hard turning, rough turning and high-speed machining. However, the wear resistance comes close to that of cBN, thus the disclosed binderless WC can substitute cBN tools in many places. Due to the easier, less capital intensive, therefore cheaper, production process the production economics of the disclosed WC are by far better than those of cBN tools.

The results further suggest that the disclosed WC tool material is equally superior in the turning of other types of MMC, ceramics, plastics, and wood based products.

The good mechanical properties of pure, ultrafine-grained, Co-free WC (wear resistance, strength, Young's modulus, fracture toughness) suggest that this material is also potentially useful for drilling, milling and honing of metals, plastics, and wood based products.

Various plastics and acrylic glasses were cut for fine finishing under the conditions shown below. The surface finish was measured with a profilometer (Profilograph 209).

| Cutting tools | WC-Co (BK8) | Disclosed WC |
|---|---|---|
| Cutting speed / m/min | 300 | 300 |
| Feed rate/ mm/rev | 0.1 | 0.1 |
| Depth of cut | 0.1 | 0.1 |
| Work piece materials | Surface roughness/Ra | |
| Getinaks | 1.5 | 0.8 |
| Steklotekstolit | 2.0 | 1.25 |
| Stekloplastik | 2.5 | 1.0 |

For all the three plastic material the disclosed WC is significantly more effective in obtaining a good surface finish than the WC-Co tool.

EXAMPLE 2

Cutting Tool from Microwave Sintered WC 60 g of the tungsten carbide powder was milled with 90 g cobalt-free tungsten carbide balls (average diameter: 4 mm) in n-hexane for ca. 170 hrs on a roller bar mill. 3 ml of the slurry was filled into a die set for pressure filtration and consolidated for ca. 20 min into a solid tablet of 20 mm under a constant pressure of 5 MPa. The tablet was dried at ambient conditions for 3 hrs and then for another 2 hrs at 400° C. in a vacuum furnace ($10^{-3}$ Pa).

A laboratory-type microwave furnace operating at 2.45 GHz (single mode) was available with a programmable, continuous wave power output up to 1000 W. The furnace was equipped with a tunable microwave cavity containing a specimen compartment suitable for operation under controlled atmosphere and reduced pressures. The specimen was placed in a porous zirconia crucible (ca. 80–85% porosity) which was covered with a zirconia lid. The zirconia lid contained a 4 mm hole for monitoring the temperature by a 2-color pyrometer through an optical port. The specimen compartment was evacuated to a pressure of ca. $10^{-3}$ Pa. Sintering was carried out by ramping the power within 5 to 10 min to ca. 700 W with dwell times ranging from 2–20 min. A suitable temperature range for sintering was found to be 1840° C.–1890° C. A number of experiments had to be carried out to find conditions providing a specimen with a maximum relative density of 98.7%. A noticeable amount of WC evaporated and deposited on the zirconia. This specimen was processed into a tool insert as detailed in Example 1 and tested under the conditions stated below. Hardness and fracture toughness measurements were carried out as described in Example 1 and a microstructural assessment to determine grain size was carried out on fractured surfaces.

$\phi$ (cutting edge angle): 45°, $\phi_1$ (face cuttingedge angle): 45°, $\gamma$ (tool rake angle): 6°, $\lambda$ (tool cutting edge inclination angle): 0°

Work piece material: X12M steel, cutting speed: 300 m/min, feed rate: 0.5 mm/rev, depth of cut: 2 mm.

Tool Properties

Average grain size: 0.4 $\mu$m hardness: 24.4+/−0.4 GPa fracture toughness: 9.6+/−0.6 MPam$^{1/2}$ wear time (0.4 mm): 24 min The wear behavior and cutting performance improved noticeably compared to similar conditions in Example 1. This is attributed to the somewhat finer grain size. The microstructure showed a lower tendency of exaggerated grain growth, which is attributed to the wet powder processing and the more pronounced in-situ heating of the specimen.

EXAMPLE 3

Cutting Tool from Nanosized WC

An ultrafine grained fraction of WC with a particle size of approximately 80 nm was produced from the powder used in Example 1 by carrying out a milling step as outlined in Example 2, subsequently diluting the dispersion to about 4 vol % solid content by using an ultrasonic bath and settling the large-particle fraction of the powder out in a glass column, siphoning off the supernatant containing the fines and concentrating the supernatant dispersion in an evaporator until it started to thicken. This procedure was carried out several times to finally receive ca. 6 ml of concentrated slurry which was pressure-filtrated and dried as detailed in Example 2. A set of specimens was produced this way and is referred to as "Nano-specimens".

For comparison, another set of specimens (referred to as "reference specimens") were processed into green compacts as detailed in Example 2.

Sintering was further carried in the modified uniaxial press with direct current heating as described in Example 1, but using a graphite die set with (ID: 20 mm, OD: 40 mm, length: 60 mm). Conditions were the same as in example 1, but with constant heating rates of 200° C./min up to maximum temperature (see table below). The reference specimens and Nano-specimens were used to determine adequate conditions for sintering. A subset of the reference specimens was produced under conditions which can be described as overheated to promote more grain growth. This served as a comparative basis for commonly available binderless WC materials which usually show grain sizes above 2 $\mu$m.

Characterization was carried out as outlined above and turning tests were carried out with tool inserts made according to Example 1 on X12M steel with cutting speed 200 m/s, feed rate 0.32 mm/s and depth of cut 0.2 mm.

| Specimen | Reference 1 | Reference 2 | Reference 3 | Nano 1 | WC-Co/ BK8 |
|---|---|---|---|---|---|
| Max. Sintering Temperature/° C. | 1630 | 1750 | 1800 | 1540 | |
| Dwell time/ min | 1 | 20 | 20 | 1 | |
| Relative density/ % | 98.7 | 99.1 | 99.8 | 97.2* | |
| mean grain size/ $\mu$m | 0.5 | 2.1 | 5.5 | 0.1 | |
| Vickers hardness HV$_{10}$/GPa | 24.3 | 20.3 | 18.4 | 26.4 | |
| Fracture toughness MPam$^{1/2}$ | 9.1 | 8.2 | 7.6 | 10.9 | |
| Wear time/min | 91 | 57 | 40 | 146 | 5 |

*):It should be noted that the actual density of a fully sintered nanosized material is typically lower than for a micron sized material. The relative density quoted here cannot therefore be considered indicative for porosity.

The results show that the refinement of the microstructure to a grain size of 0.5 $\mu$m and below resulted in a substantial improvement in mechanical properties and wear performance. Though not investigated in detail here, it is conclusive to assume that also the materials strength (tensile, transverse rupture, fracture strength) is also substantially improved, all in all resulting in a much better wear performance than coarse grained WC (mean grain size>1 $\mu$m).

EXAMPLE 4

Grain Size Refinement by Using Grain Growth Inhibitors

Using the powder processing procedure for producing a green compact as described in Example 2, 2 vol % of a nanosized $Cr_2C_3$ (mean grain size 80 nm as determined by X-ray techniques and scanning electron microscopy) was added as a grain growth inhibitor and sintered as under the conditions described in Example 2 (for maximum temperature see table below). A second specimen was produced in the same way but containing nanosized VC (60 nm mean particle size, as determined by X-ray techniques and scanning electron microscopy).

Hardness and toughness measurements, grain size and microstructure evaluation were carried out as stated in Example 1. Wear tests were carried out again on X12M steel with conditions described in Example 2: Cutting speed: 300 m/min, feed rate: 0.5 mm/rev, depth of cut: 2 mm.

| Specimen | Specimen from Example 1 | 2 vol % $Cr_2C_3$ | 2 vol % VC |
|---|---|---|---|
| Sintering temperature/° C. | 1640 | 1640 | 1640 |
| Dwell time/ min | 2 | 2 | 2 |
| Relative density/% | 98.9 | 98.6 | 98.6 |
| Mean WC grain size/μm | 0.5 | 0.35 | 0.35 |
| Vickers Hardness $HV_{10}$/GPa | 24.4 | 24.6 | 24.7 |
| Fracture toughness $MPam^{1/2}$ | 9.2 | 9.8 | 9.7 |
| Wear time / min | 22 | 23 | 23 |

The results show that the addition of nano-sized additives effectively reduces the WC grain size and also promotes a somewhat better cutting performance. The improved fracture toughness and finer grain size may compensate for an assumed loss in strength due to weaker VC-WC or $Cr_2C_3$-WC grain boundaries.

We claim:

1. A binderless high-purity tungsten carbide cutting tool material made by a sintering procedure comprising the steps of:

providing an ultrafine, stoichiometric tungsten carbide powder with a specific surface area of more than 4 $m^2/g$ and a non-oxide purity of equal to or better than 99.9%; and avoiding any contamination by nickel, cobalt, iron of said tungsten carbide powder during any manipulation or powder processing prior to sintering; and providing a vacuum or inert atmosphere during the sintering process thus maintaining the oxygen partial pressure below $10^{-1}$ Pa within the sintering environment; and applying an external mechanical pressure of less than 200 MPa to said tungsten carbide powder batch being sintered; and consolidating and bonding said tungsten carbide powder batch being sintered into a strong body by applying heat generated by an electric current passing through said tungsten carbide powder batch, or microwaves, or induction within said powder batch, wherein at least a significant part of the heat is generated within said tungsten carbide powder batch, providing a maximum temperature therein in the range of 1500 to 1900° C.

2. The cutting tool material of claim 1 comprising a mean particle size of equal to or less than 0.5 μm; and a relative density of equal to or more than 98%; and an impurity content of less than 0.1% by weight except chromium carbide ($Cr_2C_3$) and vanadium carbide (VC).

3. The cutting tool material of claim 1, wherein said material possesses a

Vickers Hardness $HV_{10}$ equal to or better than 23 GPa; and a fracture toughness $k_{fc}$ equal to or better than 8 $MPam^{1/2}$.

4. The cutting tool material of claim 1, wherein a volume fraction of less than 5 percent of said tungsten carbide exceeds 2 μm in grain size.

5. The cutting tool material of claim 1, wherein the content of iron, cobalt or nickel is less than 0.01% by weight.

6. The cutting tool material of claim 1, wherein said cutting tool material contains $Cr_2C_3$ or VC up to 2.0% by volume.

7. The cutting tool material of claim 1, wherein the sintering process is carried out within an electrically conducting die set which is additionally heated by said electric current, or said induction, or wherein the die-set material is susceptible to and heated by said microwaves.

8. The cutting tool material of claim 1, wherein said electric current is a direct current or alternate current.

9. The cutting tool material of claim 1, wherein said electric current is pulsed at a frequency between 50 Hz and 1 MHz.

10. The cutting tool material of claim 1, wherein the sintering process is preceded by a powder processing procedure comprising the steps of:

deagglomerating said tungsten carbide powder by milling in a non-polar solvent for an extended period of time by using metal-free milling media and components; and removing the solvent by spray-drying said milled powder slurry into deformable granules, and subsequent die-pressing the granules; or, alternatively, pressure-filtrating said wet and milled tungsten carbide powder into a green compact prior to vacuum or oven drying.

11. The cutting tool material of claim 1, wherein a homogeneous mixture of said ultrafine tungsten carbide and a growth inhibiting carbide is provided with said growth inhibiting carbide being either chromium or vanadium carbide or both, comprising a mean particle size of 100 nm or less, and being added in quantities ranging from 0.1 to 2% by volume.

12. The cutting tool material of claim 1, wherein the sintering process is carried out in an atmosphere containing 20% hydrogen by volume or less.

13. The cutting tool material of claim 1, wherein the heating rates applied are at least 50° C./min, but preferably faster than 150° C./min.

14. The cutting tool material of claim 1, wherein the heating profile comprises of:

a first stage with a fast heating rate, ranging from room temperature to a temperature where the densification rate approximately reaches its maximum, and a second stage with said heating rate of the first stage being reduced by a factor of 2, beginning with said maximum of the densification rate and ending with the densification rate approaching zero; and a dwelling stage of 1 to 15 min at the maximum temperature reached during the second stage; and a final cooling stage with essentially no sintering.

15. The cutting tool material of claim 1 being used to machine iron based alloys.

16. The cutting tool material of claim 1, wherein the iron based alloy being machined is steel.

17. The cutting tool material of claim 15, wherein the iron based alloy being machined is grey cast iron.

18. The cutting tool material of claim 1 being used to machine aluminum alloys.

19. The cutting tool material of claim 1 being used to machine titanium alloys.

20. The cutting tool material of claim 1 being used to machine nickel based alloys.

21. The cutting tool material of claim 1 being used to machine glasses or glass ceramics.

22. The cutting tool material of claim 1 being used to machine metal-matrix composites.

23. The cutting tool material of claim 22, wherein the metal-matrix-composites being machined contain one or more different ceramic phases.

24. The cutting tool material of claim 1 being used to machine plastics.

25. The cutting tool material of claim 1 being used to machine wood and wood based products.

* * * * *